Patented Oct. 5, 1954

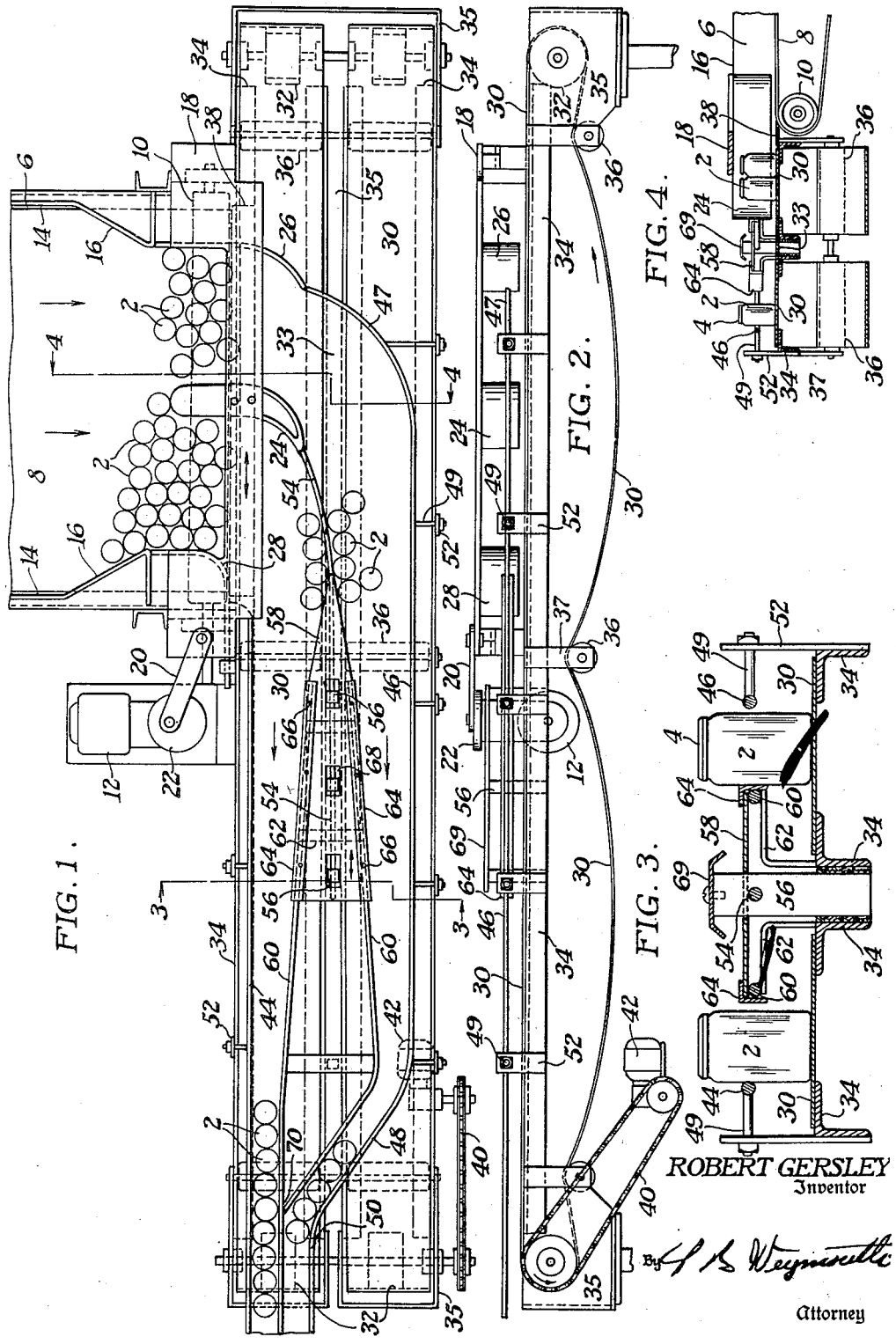

2,690,831

UNITED STATES PATENT OFFICE 2,690,831

ARTICLE HANDLING MACHINE

Robert Gersley, Canandaigua, N. Y., assignor to Beech-Nut Packing Company, Canajoharie, N. Y., a corporation of New York Application December 19, 1950, Serial No. 201,661

5 Claims. (Cl. 198—30)

1

The present invention relates to machines for handling articles, and has special reference to machines for receiving glass jars or similar articles in groups from sterilizers or other sources, and arranging them in one or more single files as the jars are fed to the labeling machines, such article handling machines being commonly known as "unscramblers."

Heretofore, considerable difficulty has been experienced with the use of such machines owing to the tendency of the articles to crowd or jam as they pass from a relatively wide area where the jars are received in haphazard formation, to a narrower area where they are arranged in single file, this difficulty being frequently experienced in the case of small jars such as those commonly used for baby or strained foods.

One of the objects of the present invention is to provide a machine of the character indicated in which the disadvantage above described of the prior machines is overcome.

Another of the objects of the invention is to provide a machine of this character which is simple in construction and efficient in operation.

The several features of the invention, whereby these and other objects may be attained, will be readily understood from the following description and accompanying drawings, in which:

Figure 1 is a plan view of a portion of a machine embodying the features of the invention in their preferred form, glass jars or other cylindrical articles being shown as they are handled by the machine;

Fig. 2 is a side view of the machine; and

Figs. 3 and 4 are transverse sectional views respectively taken on the lines 3—3 and 4—4 of Fig. 1.

The machine illustrated in the drawings is particularly adapted for use in handling small glass jars 2 that are closed by caps 4, such as jars commonly used for strained or baby foods.

The machine is provided with a feed-in trough 6 which receives the jars in haphazard arrangement, the jars being stood upright. This trough comprises a wide flat metal conveyor belt 8 which passes over a terminal roll 10 which is driven through suitable reducing gears (not shown) by an electric motor 12. The trough is provided with sides 14 having converging end portions 16, the sides overlying the conveyor belt.

A plate 18 extends over the terminal roll 10 of the conveyor belt, and is spaced a sufficient distance above the belt to permit the articles conveyed by the belt to pass thereunder. This plate is reciprocated across the belt by a link or pitman 20 having one end connected with the plate and its other end connected with an actuating disk 22 driven through auxiliary reducing gears by the motor 12. The plate has a total movement of approximately 1 inch at 30 cycles per minute.

Depending from the underside of the plate 18 is a centrally located guide bar 24 having a portion thereof projecting beyond the outer edge of the plate and curved and tapering as shown, and curved end guides 26 and 28, the end guide 26 projecting beyond the outer edge of the plate 18, and the guide 28 spaced outwardly from said edge of the plate.

Extending transversely of the conveyor belt 8 are two parallel link belts 30 that pass over terminal pulleys 32, the corresponding pulleys of the two belts being secured on a common shaft. The margins of the upper stretches of the belts slide over the upper horizontal legs of angle irons 34 supported at their ends on the machine frame 35. The belt return runs pass over idlers 36 in hangers 37 depending from the angle irons 34. The belts run at approximately 125 feet per minute. The space between the upper runs of the belt is closed by a filling strip 33 secured on the inner angle irons 34.

Between the input end of the conveyor belt 8 and the belts 30 there is a spacing strip 38 over which the articles may slide from the conveyor belt to the belts 30 (Fig. 4).

The belts 30 may be driven by means of a sprocket chain 40 which passes over a sprocket wheel on the shaft of the output terminal rolls 32 of the belts, and a sprocket wheel connected through speed reducing gearing (not shown) with a motor 42.

During the operation of the machine, the curved guides 24, 26, and 28 on the underside of the reciprocating plate 18 tend to agitate the jars 2 as they are fed from the trough 6, and to direct the jars on to the belts 30 where guiding means extending over these belts serve to guide the jars in two separate files or columns.

Except as hereinafter described, the parts above referred to may be and preferably are the same as the corresponding parts of machines heretofore in commercial use.

With the prior machines, considerable difficulty has been experienced owing to the tendency of the jars to crowd or jam as they pass from the trough 6 and are guided so as to form single files as they are carried by the parallel belts 30, and such tendency is especially serious in the case of small glass jars that are slightly out of round or uneven.

In accordance with the present invention, a guide rod 44 is spaced a distance above the outer margin of the further belt 30, viewing Fig. 1, and extends from the output end of said belt 30 to a point in proximity to the reciprocating plate 18.

A guide rod 46 has the major portion of its length spaced a distance above the outer margin of the other belt 30. The front end portion of this rod at 47 is curved and its end is arranged adjacent the end of the guide bar 26. The rear of the rod 46 has an inwardly inclined portion 48, and a portion 50 that overlies the inner margin of the rear end of the further belt 30.

The guide rods 44 and 46 are supported by stud bolts 49 projecting therefrom which are secured to brackets 52 projecting upwardly from the angle irons 34.

Welded to the inner end of guide bar 24 is a rod 54 curved for part of its length and straight for the remainder. The latter portion lies midway between the belts 30 and is guided in holes through posts 56 that are welded between the inner angle irons 34. The rod 54 is welded to the under side of a wedge-shaped plate 58. The nose of this plate is narrowed down to the diameter of the rod 54 at its upstream end, the better to divide the stream of jars. The rod 54 does not entirely support the plate 58, but is supplemented by additional rods 60 supported on legs 62 welded to angles 34 in a manner to avoid interference with the belts 30.

The wedge plate 58 has small angles 64 at its edges for reinforcement and to absorb wear, and oil holes 66 are provided (Fig. 1) so that the plate will slide easily on the rods 60. The plate 58 is provided with slots 68 to permit it to reciprocate longitudinally on the posts 56. The upper ends of the posts may be provided with guard members 69.

The rods 60 are brought together at 70 and the further rod has its rear end portion arranged midway between the guide rods 44 and 46. Thus the rods 60 with the rods 44 and 46 form two guiding channels for the jars carried by the belts 30.

As the jars pass from the trough 6 in two streams to the belts 30, the gentle and limited reciprocating movements of the plate 58 have the effect of alternately spreading and then relieving the jars, thereby forestalling any continuous linear movement. It also tends to rotate some of the jars in a direction opposite to the movement which seems to be automatically engendered by their crowded condition as they leave the trough 6. The jars are moved only by the "tendency drive" of the smooth metal belts 30 on which they rest so there is no positive push on any of them. They flow smoothly and without jamming as they are gently worked into single files or columns as they are carried by the belts. Thus the danger of jamming or crowding and consequent breakage is substantially eliminated even in the case of the small jars above described.

As will be evident to those skilled in the art, my invention permits various modifications without departing from the spirit thereof or the scope of the appended claims.

What I claim is:

1. In a machine for handling articles of the class described, a conveyor for receiving the articles in haphazard formation but standing upright thereon, two conveyor belts arranged transversely of the delivery end of said conveyor for receiving the articles from the conveyor, a plate extending over the delivery end of said conveyor beneath which the articles are adapted to pass, a centrally located guide and end guides depending from the under side of said plate for guiding the articles in two streams as they pass from the conveyor to said belts, means for reciprocating said plate across said conveyor so as to cause said depending guides to agitate the articles as they pass beneath the plate, and guiding devices overlying said belts for respectively guiding the two streams of articles as they are conveyed by the belts to cause the articles in each stream to be arranged in a single file as they approach the delivery ends of the belts, comprising a wedge-shaped member tending to spread the two streams, and a rod connecting said member with said centrally located guide so as to cause said wedge-shaped member to be reciprocated longitudinally with said guide and plate.

2. In a machine for handling articles of the class described, an endless conveyor, means for delivering articles in two streams to the conveyor with the articles in each stream arranged in haphazard formation and standing upright thereon, and guiding devices overlying the conveyor for guiding the two streams of articles as they are conveyed by the conveyor and to cause the articles in each stream to be arranged in a single file as they approach the delivery end of the conveyor comprising a wedge-shaped member tending to spread the two streams, and means for reciprocating said wedge-shaped member longitudinally.

3. In a machine for handling articles of the class described, two conveyor belts arranged side by side, means for delivering articles in two streams to said belts respectively with the articles in each stream arranged in haphazard formation and standing upright thereon, and guiding devices overlying the belts for guiding the two streams of articles as they are conveyed by the belts and to cause the articles in each stream to be arranged in a single file as they approach the delivery end of the belt comprising a wedge-shaped member tending to spread the two streams, and means for reciprocating said wedge-shaped member longitudinally.

4. A structure according to claim 3 in which the guiding devices for one of the streams of articles guides the articles on the belt on which they are carried to the other belt as the articles approach the delivery ends of the belts.

5. In a machine for handling articles of the class described, a conveyor for receiving the articles in haphazard formation but standing upright thereon, two conveyor belts arranged transversely of the delivery end of said conveyor for receiving the articles from the conveyor, a plate extending over the delivery end of said conveyor beneath which the articles are adapted to pass, a centrally located guide and end guides depending from the under side of said plate for guiding the articles in two streams as they pass from the conveyor to said belts, means for reciprocating said plate across said conveyor so as to cause said depending guides to agitate the articles as they pass beneath the plate, and guiding devices overlying said belts for respectively guiding the two streams of articles as they are conveyed by the belts to cause the articles in each stream to be arranged in a single file as they approach the delivery ends of the belts, the improvement which comprises said guiding devices including a wedge-shaped member extending longitudinally over the belts tending to spread the two streams as they are delivered to the belts, and means connected with said reciprocating plate for reciprocating said wedge-shaped member longitudinally.

References Cited in the file of this patent

UNITED STATES PATENTS

| Number | Name | Date |
|---|---|---|
| 804,459 | Ellingwood | Nov. 14, 1905 |
| 2,468,290 | Carter | Apr. 26, 1949 |
| 2,484,222 | Hauswald | Oct. 11, 1949 |
| 2,515,871 | Hartmann | July 18, 1950 |
| 2,555,602 | Nutt | June 5, 1951 |